United States Patent [19]

White

[11] Patent Number: 4,979,816

[45] Date of Patent: Dec. 25, 1990

[54] RANGE SENSING SYSTEM

[76] Inventor: Steven J. White, 3816 40th NE., Seattle, Wash. 98105

[21] Appl. No.: 65,339

[22] Filed: Jun. 22, 1987

[51] Int. Cl.[5] .............................................. G01C 3/08
[52] U.S. Cl. ...................................................... 356/4
[58] Field of Search ...................................... 356/4, 5

[56] References Cited

U.S. PATENT DOCUMENTS

| | | |
|---|---|---|
| 2,994,882 | 8/1961 | Isley, Jr. . |
| 3,723,713 | 3/1973 | Banner et al. . |
| 4,181,431 | 1/1980 | Chaborski ............................... 356/5 |
| 4,208,125 | 6/1980 | Ling ........................................ 356/5 |
| 4,344,705 | 8/1982 | Kompa et al. ......................... 356/5 |
| 4,397,549 | 8/1983 | Morgan .................................. 356/5 |
| 4,413,905 | 11/1983 | Holzapfel ......................... 356/28 X |
| 4,518,256 | 5/1985 | Schwartz ............................... 356/5 |
| 4,613,231 | 9/1986 | Wichmann ............................. 356/5 |
| 4,628,469 | 12/1986 | White . |
| 4,964,048 | 8/1984 | Farlow .................................. 356/5 |

FOREIGN PATENT DOCUMENTS 0169608 10/1982 Japan ....................................... 356/4

Primary Examiner—Thomas H. Tarcza
Assistant Examiner—Mark Hellner
Attorney, Agent, or Firm—Christensen, O'Connor, Johnson & Kindness

[57] ABSTRACT

An optical range sensing system that includes a source (80) for producing a pulse of light directed toward an object, and a receiver that comprises a photosensitive charge integrating device (90). The receiver receives a return pulse reflected by the object, and generates a first signal having a magnitude corresponding to the integrated intensity of the return pulse. A circuit (92, 94) coupled to the receiver produces a second signal having a magnitude corresponding to the time integral of the first signal. A processor (96) determines the range of the object by determining the quotient of the magnitude of the second signal divided by the magnitude of the first signal. The photosensitive charge integrating device may be realized using a CCD array element. By including imaging optics (124) and a plurality of photosensitive charge integrating devices (126), two- and three dimensional views of the object may be obtained.

17 Claims, 3 Drawing Sheets

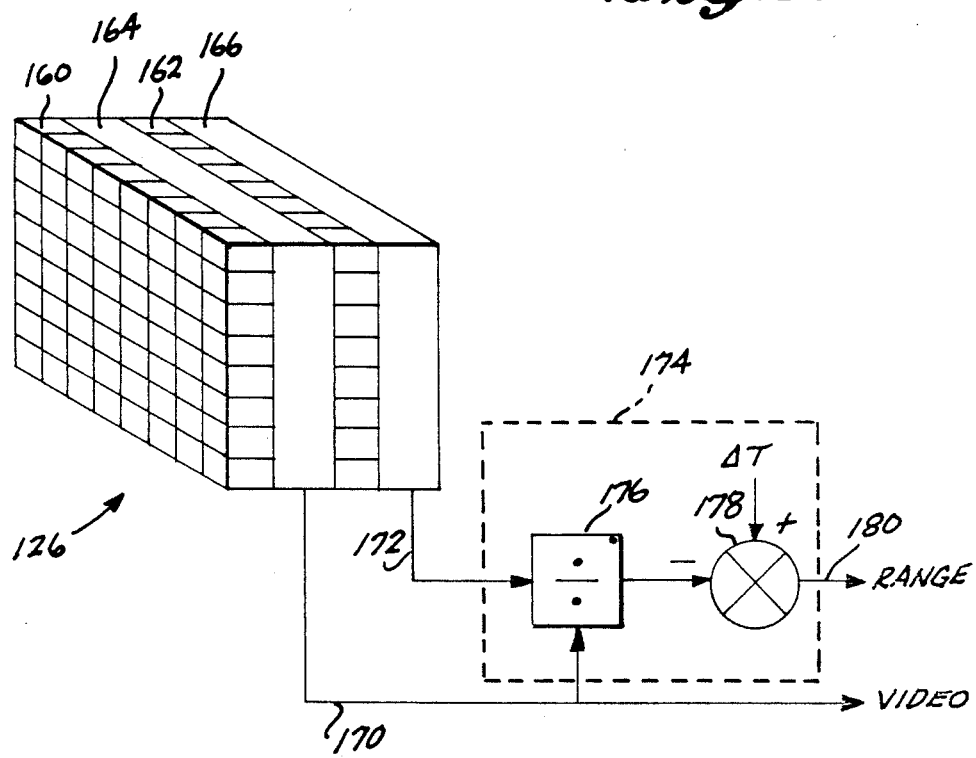

RANGE SENSING SYSTEM

FIELD OF THE INVENTION

The present invention relates to optical techniques for sensing absolute and relative range information.

BACKGROUND OF THE INVENTION

The general concept of an optical radar (LIDAR) is well known, and in one variation simply includes a source for directing a pulse of light at an object, and a receiver for receiving the light and determining the range of the object from the elapsed time. Although this technique can be used for objects at comparatively large ranges, it is impractical for the measurement of moderate ranges (e.g., 20 meters–2 km) at high accuracy (e.g., 0.1%). A second limitation of conventional LIDAR systems includes the difficulty in correlation of two-dimensional (grey scale) and three-dimensional (range) images. The use of multiple sensor systems has been increasingly important in machine recognition. By combining two- and three-dimensional techniques, more robust recognition and localization techniques are possible than either alone. Potential applications for a combined imaging and ranging system include intelligent robotics, remote field sensing, object recognition, and three-dimensional television.

SUMMARY OF THE INVENTION

The present invention provides an optical range sensing system that is capable of producing extremely accurate measurements at moderate ranges. In a preferred embodiment, the system provides two- and three-dimensional views of an object, with implicit registration between the views.

In one embodiment, the range sensing system of the present invention comprises a receiver for optically detecting a return pulse of light that has been reflected by the object in response to an illumination pulse. The receiver comprises a photosensitive charge integrating device that receives the return pulse, and generates a first signal having a magnitude corresponding to the integrated intensity of the return pulse. Means coupled to the receiver produce a second signal having a magnitude corresponding to the time integral of the first signal. A processing means then determines the range of the object by determining the quotient of the magnitude of the second signal at a given stop time, divided by the magnitude of the first signal at the stop time. In a preferred embodiment, the system includes an optical source for generating the illumination pulse, and for also generating a start signal indicating the time at which the illumination pulse is produced. The processing means determines range by subtracting the quotient from a time interval $\Delta T$ that is equal to the time between the start signal and the stop time.

In a further embodiment, the invention provides a system for measuring the topography of an object by measuring the range of a plurality of points on the object. In this embodiment, the receiver comprises a plurality of photosensitive charge integrating devices, and an imaging system for imaging the points onto the respective devices, such that each device receives a return pulse from one of the points. The plurality of photosensitive charge integrating devices may comprise a linear or two-dimensional CCD array. In the two-dimensional embodiment, the range sensing device may be adapted to provide registered two-and three-dimensional images of the object.

BRIEF DESCRIPTION OF THE DRAWINGS

FIG. 5 illustrates a two-dimensional sensor.

DETAILED DESCRIPTION

Figure 1A:
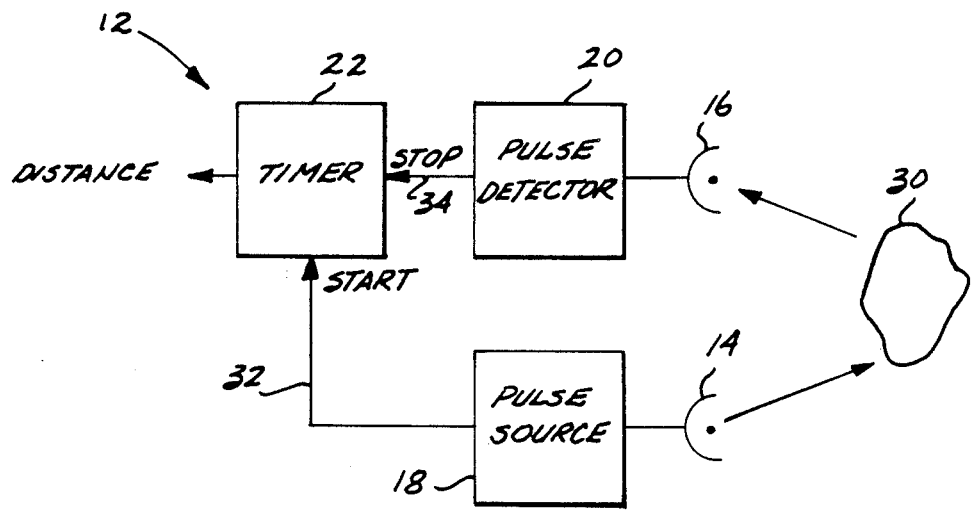
FIGS. 1A and 1B illustrate conventional optical radar systems.
Figure 1B:
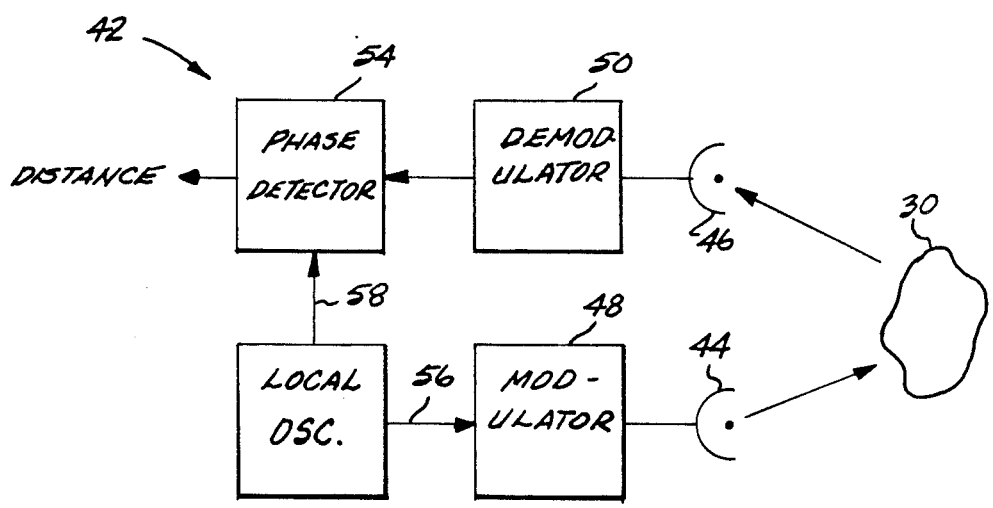

FIGS. 1A and 1B illustrate two types of prior optical radar systems. In FIG. 1A, optical radar system 12 comprises optical source 14, optical detector 16, pulse source 18, pulse detector 20 and timer 22. Pulse source 18 causes optical source 14 to emit an illumination pulse of light towards object 30, and simultaneously issues a start signal on line 32. Object 30 reflects a portion of the illumination pulse to produce a return pulse that is received by optical detector 16. When pulse detector 20 senses that a light pulse has been received by the optical detector, it produces a stop signal on line 34. The time between the start and stop signals is determined by timer 22, to produce a measure of the distance between the radar system and object 30.

A second prior art LIDAR system is shown in FIG. 1B. The system 42 of FIG. 2 includes optical source 44, optical detector 46, modulator 48, demodulator 50, local oscillator 52 and phase detector 54. Local oscillator 50 provides a carrier signal to modulator 48 on line 56 and to phase detector 54 on line 58. Modulator 48 modulates the carrier signal, and the modulated signal is emitted by optical source 44. A portion of the light is reflected by object 30 and received by optical detector 46. The return signal is demodulated by demodulator 50, and phase detector 54 detects the phase shift experienced by the demodulation signal, to produce a measure of the range of object 30.

The principal problems with the systems shown in FIGS. 1A and 1B are inadequate temporal (and therefore spatial) resolution, due to phase insensitivity in direct time of flight techniques, and to the complexity of sensing and the modulo effects of modulated sources and phase detection.

Figure 2:
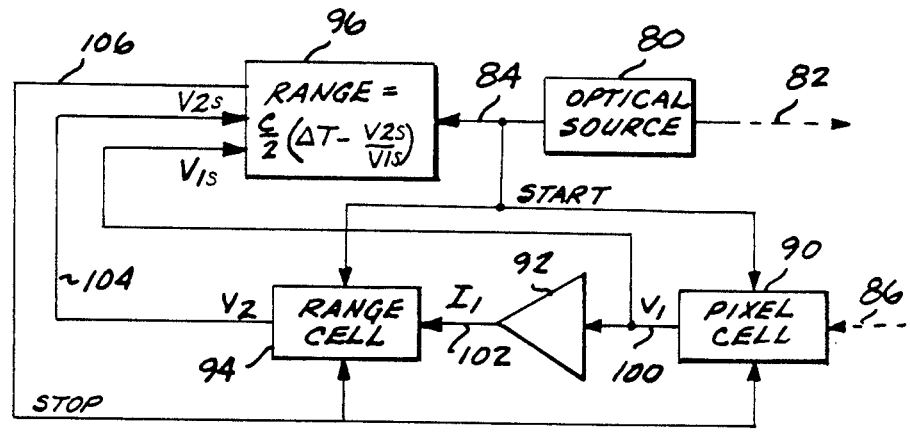
FIG. 2 is a block diagram of the range sensing device of the present invention.

A range sensing system according to the present invention is illustrated in FIG. 2. As with the radar system shown in FIG. 1A, the range sensing system illustrated in FIG. 2 includes optical source 80 that generates an illumination pulse of light along path 82 directed at an object, and that also produces a corresponding start signal on line 84. The terms "optical" and "light" should be understood to include infrared, visible and ultraviolet radiation. The system shown in FIG. 2 also includes pixel cell 90 that comprises an integrating photosite, voltage-to-current converter 92, range cell 94 that comprises a charge integrating device, and signal processing device 96. The start signal is provided to signal processing device 96, and is used therein for the calculation of $\Delta T$, as described below. The start signal is also used to reset the range and pixel cells, e.g., by reducing their stored charges to zero.

At some time after being reset by the start signal, pixel cell 90 receives the return pulse of light reflected by the object along path 86, and produces an output voltage $V_1$ on line 100 that corresponds to the instantaneous value of the integrated intensity of the light received at the pixel cell. Converter 92 produces a current $I_1$ on line 102 that is proportional to the instantaneous voltage $V_1$ on line 100. Range cell 94 integrates the current $I_1$ on line 102, and produces an output voltage $V_2$ on line 104 having a magnitude equal to the time integral of current signal $I_1$. At a predetermined time $\Delta T$ after receiving the start signal, signal processing circuit 96 issues a stop signal on line 106 that causes the pixel and range cells to provide samples $V_{1s}$ and $V_{2s}$ of the respective $V_1$ and $V_2$ voltage signals, the $V_{1s}$ and $V_{2s}$ samples being taken at the time that the stop signal is received. Signal processing circuit 96 then reads the $V_{1s}$ and $V_{2s}$ samples on lines 100 and 104, respectively, and determines the range R to the target according to the following formula:

$$R = \frac{c}{2}\left[\Delta T - \frac{V_{2s}}{V_{1s}}\right] \quad (1)$$

where c is the speed of light, and $\Delta T$ is the time interval between the start and stop signals, i.e., the time at which the $V_{1s}$ and $V_{2s}$ samples were taken, measured from the time at which the start signal was received on line 84.

For certain applications, it will not be necessary for the range sensing system of FIG. 2 to include an optical source, or to receive a start signal from an optical source. For example, the system could be adapted for sensing the range of a target illuminated by any externally generated pulse of light. In such a system, pixel cell 90 could provide a start signal to signal processing device 96 when an optical signal was first received by the pixel cell. Such optical signal could be a return pulse from the target, or the pixel cell could be positioned so as to detect the light initially generated by the external pulse source. In a related arrangement, the start signal could be provided by an optical source that was remotely located with respect to the remainder of the range sensing system, and the start signal could be provided from the optical source to the pixel and range cells and to the signal processing device by electrical or optical means. However, the range resolution of the system indirectly depends upon the duration of the illumination pulse. Therefore, for most applications, it will be preferable to provide means for producing an illumination pulse having a suitably small pulse width.

Part of the theoretical basis for the present invention is set forth in U.S. Pat. No. 4,628,469. That patent describes a method for determining the spatial coordinates of a workpiece by illuminating the workpiece with a plane of light, imaging the illuminated workpiece with a video camera, and then for each video scan line, determining the position of the pulse that corresponds to the intersection of the workpiece and the plane of light. In one described embodiment, the position of the pulse is located by a centroid technique that for a digital system takes the general form of:

$$C = \frac{\sum\limits_{i=0}^{N} if_i}{\sum\limits_{i=0}^{N} f_i} \quad (2)$$

where $f_i$ represents samples of the video signal, and where the N+1 samples include the time period in which the pulse appears. The multiplication in the numerator of Equation (2) does not yield itself to practical implementation in an application such as light radar, since the computations must be done at the equivalent sample frequencies of over 100 megahertz, and have a very large dynamic range (up to 16 bits or over 96 db). However, as described in U.S.P. No. 4,628,469, Equation (2) can be reformulated as follows:

$$C = (N+1) - \frac{\sum\limits_{i=0}^{N}\sum\limits_{j=0}^{i} f_j}{\sum\limits_{i=0}^{N} f_i} \quad (3)$$

Equation (3) can be implemented by singly and doubly integrating the samples representing the pulse, dividing the value obtained by the double integration by the value obtained by the single integration to arrive at an offset, and then subtracting the offset from the time of the last sample to arrive at the time corresponding to the centroid of the pulse. The patent also describes a digital system for implementing this technique, including an A to D converter, and two adder/register combinations for performing the two integrations.

The technique described in U.S. Pat. No. 4,628,469 could be applied to an optical system by using the described centroid measurement technique in pulse detector 20 shown in the system of FIG. 1. If properly implemented, such a system could conceivably produce a spatial resolution of 75 mm, and a repeatability of 150 mm. Although these figures could be improved by digitizing using digital or discrete analog technique, this approach would entail significant technical difficulties and considerable expense.

The present invention is based in part on the perception that one known class of photodetectors, referred to herein as charge integrating devices, operate by integrating an input optical signal to produce a quantity of charge (and corresponding voltage) that is proportional to the time integral of the input optical signal. Known members of this class of devices include charge coupled devices (CCDs), charge injection devices (CIDs), and MOS devices. In a CCD, finite amounts of electrical charge, called packets, are created at specific photosites in a semiconductor material such as silicon. Each photosite is created by the field of a pair of gate electrodes very close to the surface of the silicon. The charge created by an input optical signal thus results in the charging of a small capacitor. Since the voltage across a capacitor is proportional to the charge thereon, the voltage produced at the photosite represents the time integral of the optical signal input to the photosite. Thus if the first stage of the receiver of an optical radar is a CCD or an equivalent charge integrating detector, the first integration required for the centroid technique of Equation (3) is performed automatically.

In FIG. 2, pixel cell 90 can be regarded as one photosite in a CCD array. Convertor 92 represents a well known class of circuits that produces an output current $I_1$ proportional to an input voltage $V_1$. Thus the current $I_1$ represents the time integral of the input optical signal. Convertor 92 could comprise an operational amplifier having line 100 connected to its noninverting input, and range cell 94 connected between its inverting input and its output. In general, it will not be necessary for the convertor to provide a linear relationship between input voltage and output current, particularly for applications for determining relative range or topography.

Current $I_1$ is input to range cell 94 that may, by way of example, be identical to pixel cell 90, but shielded from optical signals. Thus charge accumulates on range cell 94 at a rate proportional to current $I_1$, thereby charging a second capacitor that is inherent in range cell 94. Thus the output voltage $V_2$ of range cell 94 represents the time integral of the $V_1$ signal, and thus a double time integral of the input optical signal. Signal processing circuit 96 then implements Equation (3) above, to determine the range to a target.

In a typical operation sequence, optical source 80 launches an illumination pulse of light towards the target, and simultaneously produces a start signal on line 84. The start signal serves as a reset signal that shorts the capacitors of pixel cell 90 and range cell 94, thereby reducing their stored charges to zero. Signal processing circuit 96 then waits for a length of time ($\Delta T$) sufficient to permit the receipt of a return pulse, and then issues a stop signal on line 106. The stop signal causes the pixel and range cells to provide the $V_{1s}$ and $V_{2s}$ samples. The range is then found by subtracting the quotient of $V_{2s}$ divided by $V_{1s}$ from $\Delta T$, multiplying by $\frac{1}{2}$ to account for the fact that the light had to traverse the distance between the range sensing system and the object twice, and then multiplying by the speed of light.

Figure 3:
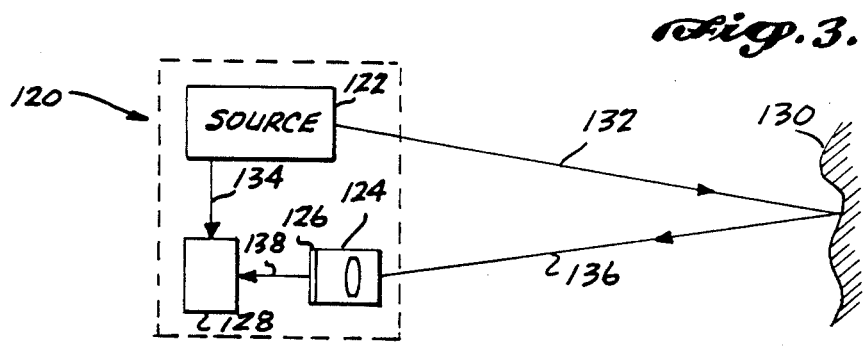
FIG. 3 is a block diagram of an embodiment of the present invention capable of producing two- and three-dimensional images of an object.
Figure 4:
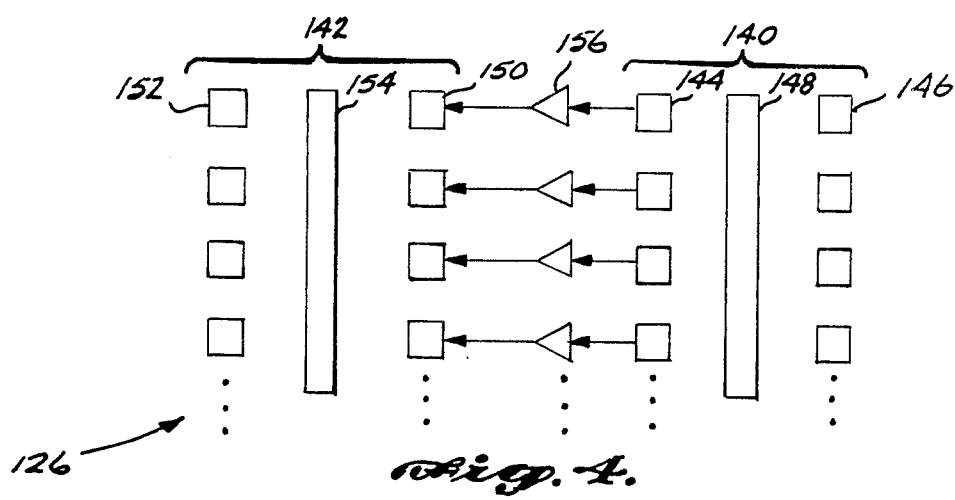
FIG. 4 illustrates a one-dimensional sensor.

Application of the present invention to the sensing of surface topography is illustrated in FIGS. 3 and 4. In FIG. 3, range sensing system 120 comprises source 122, imaging optics 124, one- or two-dimensional sensor 126, and signal processor 128. Source 122 transmits an illumination pulse of light towards object 130 along path 132, and produces a corresponding start signal on line 134. Light reflected by object 130 along path 136 is collected by imaging system 124, and focused onto sensor 126. For the purpose of illustration, it will be assumed that sensor 126 comprises a one- or two-dimensional CCD array. In such an embodiment, each element of the CCD array would include a pixel cell, a voltage-to-current converter, and a range cell, as shown in FIG. 2. Signals from sensor 126 are read out to signal processor 128 via line 138, and the signal processor produces a topographical image of object 130. In the case where sensor 126 comprises a one dimensional CCD array, a two-dimensional image is produced, the two dimensions corresponding to range and to the longitudinal axis of the CCD array. In the case where sensor 126 comprises a two-dimensional CCD array, a three-dimensional image of the object is produced.

Sensor 126 for a one-dimensional embodiment is illustrated in greater detail in FIG. 4. Sensor 126 essentially comprises a pair of side-by-side CCD arrays 140 and 142 interconnected by voltage-to-current converters. In particular, sensor 126 comprises a linear array of pixel cells or photosites 144 and a corresponding linear array of transfer cells 146 between which transfer gate 148 extends, pixel cells 144, transfer cells 146, and transfer gate 148 essentially comprising one conventional linear CCD array 140. Sensor 126 further comprises a linear array of range cells 150 and a corresponding linear array of transfer cells 152 between which transfer gate 154 extends, range cells 150, transfer cells 152 and transfer gate 154 essentially comprising a second conventional linear CCD array 142. Each pixel cell 144 is coupled to a corresponding range cell 150 by a voltage-to-current convertor 156. After each pulse produced by source 122, data is read out of transfer cells 146 and 152 in a conventional manner to signal processor 128. It should be understood that it is not necessary for the present invention to shift the data out of the sensor in a serial, CCD format. For example, the data (i.e., the $V_{1s}$ and $V_{2s}$ samples for each array element) could be shifted out in parallel form, or a random pixel access system could be provided.

A two-dimensional embodiment of sensor 126 is illustrated in FIG. 5. The sensor includes a square or rectangular array of pixel cells 160 and a corresponding array of range cells 162. Area 164 between the pixel and range cells is reserved for the shift electronics for the pixel cells, and for the voltage-to-current convertors. Area 166 on the opposite side of the range cells includes the shift electronics for the range cells. In the example shown in FIG. 5, data from the pixel cells is read out serially via line 170, and the signal on line 170 thereby provides a two-dimensional video signal. Data is read out from the range cells on line 172, to a signal processor 174 that is schematically illustrated as including a division circuit 176 and a subtraction circuit 178. Signal processor 174 performs the steps indicated in the Equation (1) for each pixel, to produce a three-dimensional range signal on line 180.

The system of the present invention has the advantages of simplicity and a small component count. The latter feature promotes close coupling of the individual circuit elements, to provide good signal-to-noise characteristics. The dynamic range of the resulting range data depends entirely on the signal-to-noise characteristics of the pixel and range cells and the voltage-to-current convertors. The sensor can be fabricated either using the stacked structure shown in FIG. 5, as is currently done in CID technology, or in a single layer structure, more common in CCD technology. In either case, similar logic to shift out the video and range signals can be used. In this way, a compact, real time, combined two- and three-dimensional sensor can be achieved. This arrangement permits full area view of two- and three-dimensional data, with implicit registration between the two- and three-dimensional images.

While the preferred embodiments of the invention have been illustrated and described, variations will be apparent to those skilled in the art. The invention is therefore not to be limited to the described embodiments, and the true scope of the invention is to be determined by the following claims.

The embodiments of the invention in which an exclusive property or privilege is claimed are defined as follows:

1. A system for sensing the range of an object by optically detecting a return pulse of light reflected by the object in response to an illumination pulse of light striking the object, the system comprising:
    a receiver comprising a photosensitive charge integrating device for receiving the return pulse and producing an electrical first signal having a magnitude corresponding to the integrated intensity of the return pulse;
    means coupled to the receiver for producing a second signal having a magnitude corresponding to the time integral of the first signal; and,
    processing means for determining the range of the object by determining the quotient of the magnitude of the second signal at a stop time divided by the magnitude of the first signal at the stop time.

2. The system of claim 1, wherein the processing means determines range by subtracting said quotient from a time interval $\Delta T$, $\Delta T$ being the time interval from a start time at or prior to the arrival of the return pulse at the receiver, to the stop time.

3. The system of claim 2, wherein the processing means includes means for determining the range R of the object by evaluating the equation:

$$R = \frac{c}{2}\left[\Delta T - \frac{V_{2s}}{V_{1s}}\right]$$

where c is the speed of light, and $V_{1s}$ and $V_{2s}$ are samples of the first and second signals respectively at the stop time.

4. The system of claim 2, further comprising an optical source for producing the illumination pulse.

5. The system of claim 4, wherein the optical source produces a start signal when the illumination pulse is produced, and wherein the processing means determines $\Delta T$ by determining the time interval between the start signal and the stop time.

6. The system of claim 1, wherein the means for producing the second signal comprises conversion means connected to sense the first signal and to produce a current signal having a predetermined relationship thereto, and charge integrating means for integrating the current signal to produce the second signal.

7. The system of claim 1, wherein the photosensitive charge integrating device comprises a photosite and a transfer cell formed in a semiconductor material, the photosite being positioned to receive the return pulse and including means for producing a quantity of charge proportional to the integrated intensity of the return pulse, the receiver further including means for periodically transferring the charge stored at the photosite to the transfer cell, and means for producing the first signal such that the first signal is proportional to said quantity of charge.

8. A system for determining the topography of an object by optically detecting return pulses of light reflected by a plurality of points on the object in response to an illumination pulse, the system comprising:
 a receiver comprising a plurality of photosensitive charge integrating devices and an imaging system for respectively imaging the return pulses from said points onto said devices, each of said devices including means for receiving one of the return pulses and for producing an electrical first signal having a magnitude corresponding to the integrated intensity of the return pulse;
 means coupled to the receiver for producing a plurality of second signals having magnitudes corresponding to the time integrals of the respective first signals; and,
 processing means for determining the range to each point by determining the quotient of the magnitude of the corresponding second signal at a stop time divided by the magnitude of the corresponding first signal at the stop time.

9. The system of claim 8, wherein the processing means determines the range of each point by subtracting said quotient from a time interval $\Delta T$, $\Delta T$ being the time interval from a start time at or prior to the arrival of the return pulse at the receiver, to the stop time.

10. The system of claim 9, wherein the processing means includes means for determining the range R of each point by evaluating the equation:

$$R = \frac{c}{2}\left[\Delta T - \frac{V_{2s}}{V_{1s}}\right]$$

for each point, where c is the speed of light, and $V_{1s}$ and $V_{2s}$ are samples of the corresponding first and second signals respectively at the stop time.

11. The system of claim 9, further comprising an optical source for producing the illumination pulse.

12. The system of claim 11, wherein the optical source produces a start signal when the illumination pulse is produced, and wherein the processing means determines $\Delta T$ by determining the time interval between the start signal and the stop time.

13. The system of claim 8, wherein the means for producing the second signals comprises, for each first signal, conversion means connected to sense the first signal and to produce a current signal having a predetermined relationship thereto, and charge integrating means for integrating the current signal to produce the corresponding second signal.

14. The system of claim 8, wherein each photosensitive charge integrating device comprises a photosite and a transfer cell formed in a semiconductor material, the photosite being positioned to receive the corresponding return pulse and including means for producing a quantity of charge proportional to the integrated intensity of the return pulse, the photosensitive charge integrating device further including means for periodically transferring the charge stored at the photosite to the corresponding transfer cell, and means for producing the corresponding first signal such that the first signal is proportional to said quantity of charge.

15. The system of claim 8, wherein the photosensitive charge integrating devices comprise a linear CCD array.

16. The system of claim 8, wherein the photosensitive charge integrating devices comprise a two-dimensional CCD array.

17. The system of claim 8, wherein the plurality of first signals comprises a video signal providing a two-dimensional image of the object, and wherein the processing means includes means for receiving the video signal and the plurality of second signals to produce a range signal providing a three-dimensional image of the object.

* * * * *